A. WHITAKER.
Butter-Workers.

No. 158,159.  Patented Dec. 22, 1874.

ATTEST
H. Sprague
Theo. S. Day

INVENTOR
A. Whitaker
By Attorney
Thos. S. Sprague

UNITED STATES PATENT OFFICE.

ABRAM WHITAKER, OF COLDWATER, MICHIGAN.

IMPROVEMENT IN BUTTER-WORKERS.

Specification forming part of Letters Patent No. 158,159, dated December 22, 1874; application filed August 11, 1873.

*To all whom it may concern:*

Be it known that I, ABRAM WHITAKER, of Coldwater, in the county of Branch and State of Michigan, have invented an Improved Butter-Worker, of which the following is a specification:

This invention has for its object to furnish a device which will effectually work out of freshly-churned butter all the buttermilk and water remaining in it after being taken up; and it consists in a long box or trough provided with a cloth-covered false bottom, upon which the butter rests, with a toothed rack secured to each of its longer sides, with which meshes a pinion at each end of a drum, provided with a crank, by which the drum is moved back and forth. The drum is longitudinally channeled, dividing it into a pentagonal wheel, whose arms are not radial but tangential to the body, for more effectually working the butter, as more fully hereinafter set forth.

Figure 1:
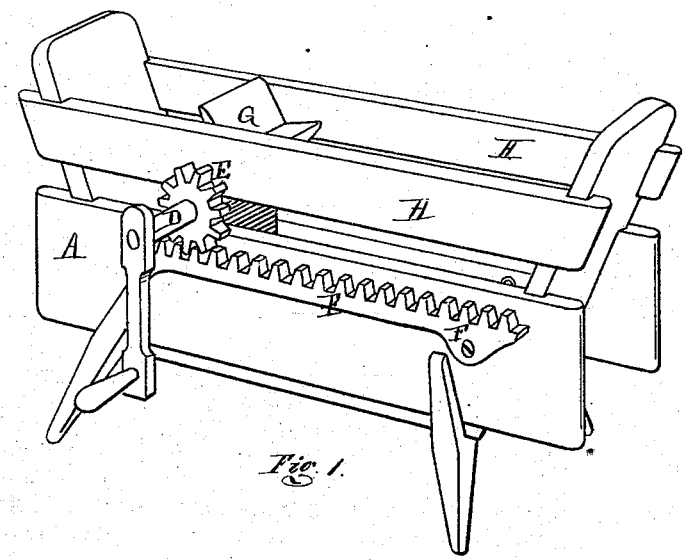
Figure 2:
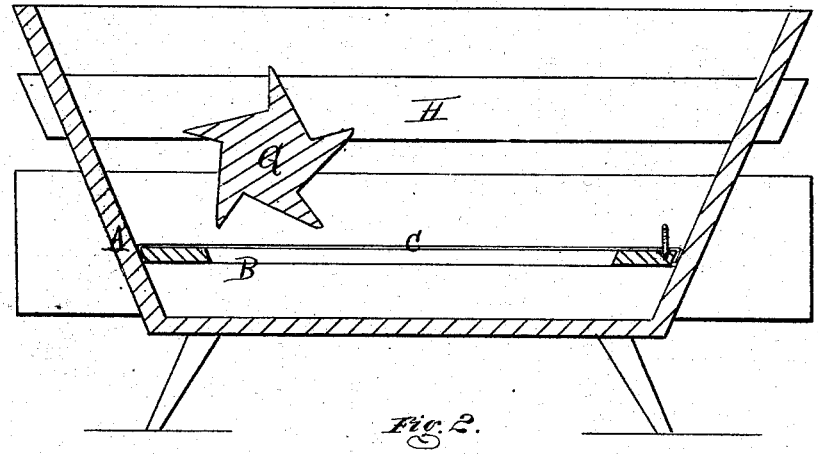

Figure 1 is a perspective view. Fig. 2 is a longitudinal vertical section.

In the drawing, A represents a trough-like box, mounted on suitable legs, and provided with a slotted false bottom, B, covered with a muslin strainer-cloth, C, through which the buttermilk and water worked out of the butter percolates into the bottom of the box, whence it may be drawn off by a plug, a, in the bottom. D is a shaft, having a crank at one end, resting across the top edges of the sides of the box. Near each end is secured a pinion, E, which meshes with toothed rack F, secured to each long side of the box. G is a roller mounted on the shaft, and having tangential blades, which, when the roller is moved in one direction, turn over the butter in furrows, pushing it back toward the end of the box, while if rotated in the opposite direction, they will crush down and compress the ridges thrown up by the reverse movement, and thus work out the water and buttermilk. H is a rail secured at each side of the box to the ends thereof, to prevent the shaft from lifting in its rotation and forward and backward movements.

What I claim as my invention, and desire to secure by Letters Patent, is—

In combination with the box A, having longitudinal slots in its sides, the roller G, with tangential blades pivoted in said slots, and arranged to operate substantially as described.

ABRAM WHITAKER.

Witnesses:
DAVID B. PURINTON,
R. A. HALL.